April 19, 1966  W. E. HENDERSON  3,247,041
METHOD AND APPARATUS FOR HEAT SEALING THERMOPLASTIC
MATERIAL BY RADIANT ENERGY
Filed May 28, 1963
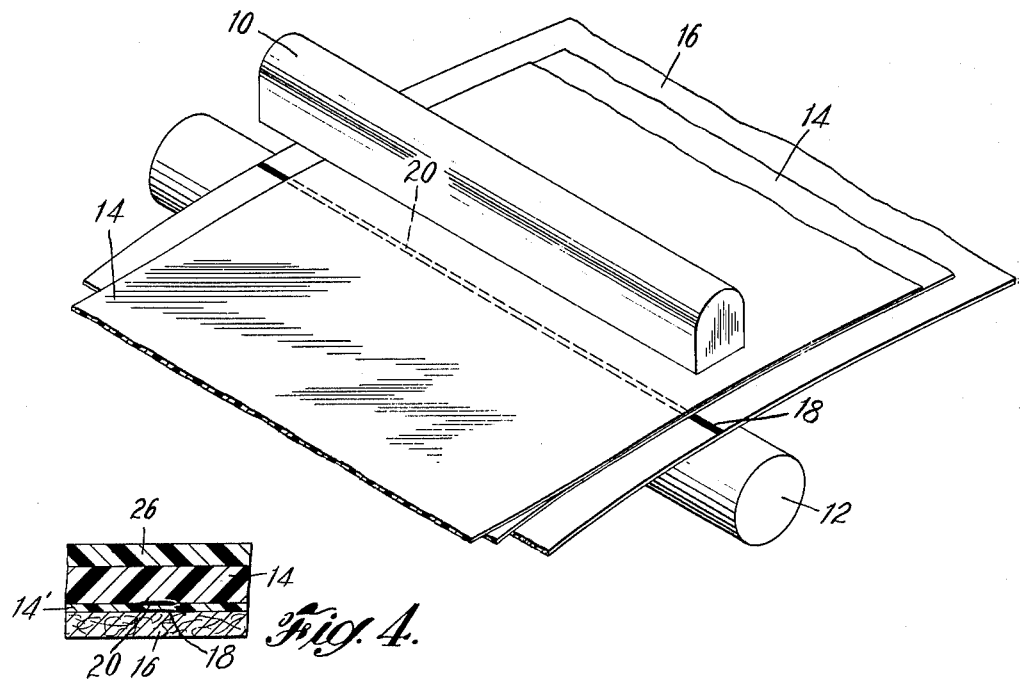
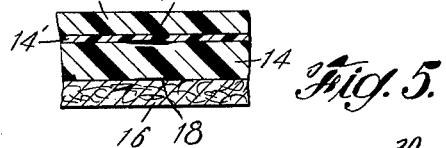
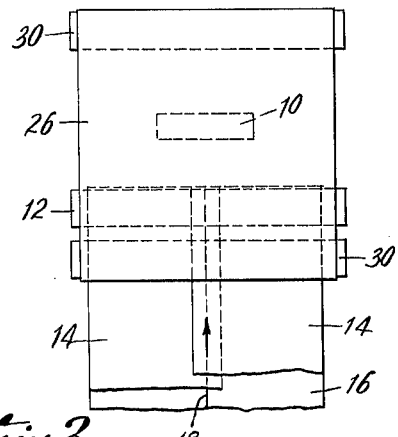
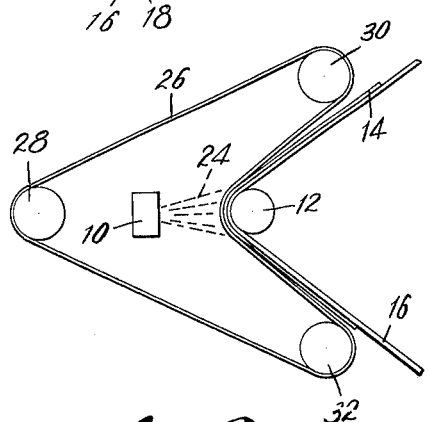
INVENTOR.
WILLIAM E. HENDERSON
BY *Barnwell P. King*
ATTORNEY United States Patent Office 3,247,041
Patented Apr. 19, 1966

3,247,041
METHOD AND APPARATUS FOR HEAT SEALING THERMOPLASTIC MATERIAL BY RADIANT ENERGY
William E. Henderson, Hinsdale, Ill., assignor to Union Carbide Corporation, a corporation of New York
Filed May 28, 1963, Ser. No. 283,931
6 Claims. (Cl. 156—272)

This invention relates to heat sealing of thermoplastic material, and more particularly to fusing sheets as well as webs of such material in preselected zones.

According to the invention there is provided a novel method of heat sealing thermoplastic material, which comprises superimposing plies of the material together in overlapping contacting relation against a heat absorbent mark such as a pattern of lines on a suitable support, and exposing the so-contacted material to a remote source of radiant energy causing the plies to fuse and seal together only opposite the areas of such mark by virtue of heat absorbed thereby from such source, through radiation which is transmitted through the material. The so-fused and sealed material subsequently may then be removed from such mark on said support.

The invention also provides apparatus for heat sealing thermoplastic sheet material, which comprises means for supporting a mark of heat absorbent material corresponding to the areas to be sealed, means for pressing the plies of the sheet material to be sealed in overlapping, contacting relation with such mark, and a source of radiant energy for energizing said heat absorbent mark which, in turn, fuses the thermoplastic material in the areas to be sealed, opposite such mark, without adhering to the heat absorbent material.

The invention is especially useful in the heat fusing of highly oriented or bioriented polyethylene films and other oriented or bioriented polyolefin films including polyethylene copolymers, polypropylene, copolymers of ethylene and propylene and mixtures of polyethylene and polypropylene, which are extremely difficult to fuse in a smooth, uniform pattern, because of heat shrink effects in the parent film immediately adjacent to the fused area. The invention has also been found useful in the sealing of polyvinyl chloride films.

In practicing the invention, advantage is taken of a characteristic of films of the type here involved, namely, the fact that they transmit radiant energy, with no appreciable absorption and, as a result, are not noticeably heated thereby except in the areas opposite the mark.

However, by applying in contact with a first outer surface of plies of thermoplastic films, a mark or indicia of carbon black or other heat absorbent material impressed on a support sheet of paper or other receptive surface, and by subjecting the film plies to radiation from the other side, while the adjoining surfaces of the film plies are held in contact by means transparent to the said radiations, such as by a belt of heat resistant plastic film; heat is produced at the indicia that is conducted through the adjacent film ply to cause a coalescence or fusion of the film's interfaces opposite the indicia on the paper's marked surface, without affecting the film's interfaces opposite unmarked portions of the paper's surface.

In this manner, a fusion or seal which is sturdy, air tight and transparent is produced between the film plies from easily applied marks or indicia on the support.

The use of a heat-absorbent mark in fusing thermoplastic film plies is an improvement over prior art heat-sealing bar, because it provides a good localized fusing effect; it provides a heat source which, due to its low mass, cools rapidly when the radiant energy is removed; and also it provides ready release of the film plies therefrom, eliminating the problem of the film sticking to the sealing bar.

The simplicity of placing a pencil mark or line defining the desired seal areas on a mark-receptive support surface, such as a sheet of paper, provides great flexibility in the formation of continuous or discontinuous line seals. The new method also makes possible the production of uniform seals of complex shape, solid or open or branched area seals, curvilinear lines and seals of geometric shapes capable of joining thermoplastic film plies in unique seal patterns.

For example, the sealing into custom or "tailored" shapes of the film plies to make such items as air pillows, mattresses and protective gloves; shaped overwraps for food such as poultry, fish and meat cuts; overwraps for produce such as bananas, lettuce and other diversely shaped articles can be easily accomplished by penciling such seal shape on a paper sheet and superimposing the film plies thereon, and running the plies through the sealing machine to obtain the desired seal according to the invention. Thus, the requirement for production in successive sequence of different shape or size sealed film items can be easily met.

In the drawings:
FIGURE 1 is a fragmentary perspective view of apparatus illustrating the invention;
FIGURE 2 is a side view of a modification;
FIGURE 3 is a top plan view of the latter; and
FIGURES 4 and 5 are greatly enlarged fragmentary views in cross-section of detailed examples of the invention.

As shown in FIGURE 1, a radiant energy source 10 such as a GE Infra-Red 1350W–280V lamp is disposed above a roll 12 so as to direct radiant energy toward overlapping sheets 14 of thermoplastic material as the latter is pressed into contact with a flexible sheet 16 of white paper, for example, provided with a line 18 of heat absorbent material, such as that produced by a "lead" pencil stroke. This causes the thermoplastic sheets to fuse directly opposite such line, forming a seal 20 corresponding thereto. The paper, subsequently is separated from the so-sealed thermoplastic sheets.

The thermoplastic sheets may be of any thickness from very thin films to sheets of 10 mils and up. The thermoplastic plies to be sealed together may be of substantially equal thickness or may be unequal in thickness. The operation may be continuous, and the sealed lines may be in any desired pattern.

As shown in FIGURES 2 and 3, belt 26 is carried by rolls 28, 30, and 32, as well as roll 12, one of which is driven by a motor (not shown) so that the plies to be sealed are moved by the belt 26, which also presses the plies together in the area exposed to radiant energy 24 from source 10 located inside of such belt.

In carrying out the present invention a pencil line 18 corresponding to the desired area or zone to be sealed is made on the sheet 16 of white paper; two plies 14, 14 of polyethylene film are placed on the paper and positioned so that the area to be sealed is immediately above the pencil marking; and the composite layers are then passed through the apparatus. The plies are thereby sealed together in, but not outside of the area located above the pencil marking on the sheet 16 of white paper which is later separated from the so-sealed plies of plastic.

For example, two plies 14, 14 of a polyolefin material were laid over a pencil line 18 on writing paper 16 and passed continuously through the apparatus by means of flexible belt 26 of transparent material, such as Union Carbide Corporation's "Trithene." The polyolefin plies were sealed together opposite the pencil line. This was done by radiation 24 from source 10 first passing through the belt 26 and then through the overlapping plies 14 of the film while the belt held the plies against the paper 16, backed up by roll 12.

Straight, curved, complex and multiple seals were effected in the same apparatus by correspondingly modifying the pencil line. For example, complete curved-bottom bags were made from two plies of polyethylene film.

The present process is remarkably effective with biaxially oriented polyolefin films, yielding strong seals without excessive puckering.

The following table sets forth actual parameters relative to FIGURES 4 and 5, respectively:

| 1 Mil Film (14') Contact with Mark Seal Strength (Fig. 4) | Time In Machine (in seconds) | 5 Mil Film (14) Contact with Mark Seal Strength (Fig. 5) |
| --- | --- | --- |
| 0.693 | 14 | no seal |
| 0.898 | 18 | 0.630 |
| 1.068* | 22 | 1.040 |

* NOTE.—1 mil parent film strength = 1.30 lbs./in. of width.

The unexpected effectiveness of this invention for producing wrinklefree seals on bioriented polyolefin films is very important.

While polyolefin films absorb radiation to some extent at certain wave lengths, they do so relatively inefficiently. Carbon absorbs such rays very effectively, so that the film over the pencil line (or other heat absorbing substance) is heated much more than the remainder of the film. A source of radiant energy which includes infra-red radiation has been found to be highly suitable.

The boundary of the heated zone is quite sharp, due to the limited opportunity for edge-wise heat transfer. The film is not in contact with any massive structure which might retain heat. Little or no pressure is necessary (as it is for thermal contact in sealing with a heated bar, for example) so that thinning of the heated area by melt flow is avoided.

The invention includes the following advantages:

(1) Holding films together during sealing can be done with a flexible film transparent to thermal radiation. The invention includes sealing against non-planar surfaces, for example, through the use of gas pressure against the films to be sealed.

(2) Low mass of heat absorbing-line facilitates cooling, avoiding sticking of the plastic thereto.

(3) Shapes of seals are easily varied from one shape to another such as from multiple pouches to curved or straight bottom bags or to inflatable structures such as air mattresses.

(4) Transverse seals are easily effected without stopping web motion in making seals according to the invention.

(5) Definition of seal area can be varied (boundary can be sharp or shaded as desired).

What is claimed is:

1. Method of permanently heat sealing transparent films composed of thermoplastic material, which comprises pressing plies of such material together in overlapping relation against a radiant heat absorbent black mark on a white support, and exposing the so-pressed material to a remote source of radiant energy of sufficient intensity to cause the plies of such material to fuse and permanently seal together only in the area opposite such mark by virtue of radiant heat absorbed thereby from such radiation, and finally separating the so-sealed plies and the support from each other after the sealing operation.

2. Method of heat sealing overlapping bioriented transparent thermoplastic films, which comprises exposing such films while they are pressed together in overlapping relation, to radiation from a remote source of radiant energy on one side and to a heat absorbent black mark on a white support on the other side, said radiation being of sufficient intensity to fuse and permanently seal such films together only at their adjoining surfaces in the area adjacent such mark by virtue of the radiant heat absorbed by such mark from such radiation, and then separating the so-sealed film from such mark.

3. Method of permanently heat sealing transparent thermoplastic material, which comprises advancing transparent plies of thermoplastic film past radiation from a source of radiant energy on a continuously advancing white support web suitably marked with heat absorbent black material, while maintaining uniform contact of the film plies in the seal area, such radiation being of sufficient intensity to fusion seal the film only in such area with radiant heat from such mark, and finally removing said support web from the so-sealed film plies.

4. Apparatus for permanently heat-sealing highly oriented transparent film ply structures of thermoplastic, comprising the combination of heat absorbent black means on a white support and transparent pressure means between which the film plies are pressed during and subsequent to fusion sealing, said means including a belt and roll providing uniform contact pressure over broad areas of the film plies to minimize necking and puckering of such highly oriented films in the so fused-sealed area, a radiation source for heating said heat absorbent means by radiation of sufficient intensity to heat said mark through said transparent pressure means and in turn fusion seal such film plies, and means for finally removing the so-fuse-sealed film from said mark, belt and roll means.

5. Method of permanently heat-sealing films of thermoplastic material, which comprises pressing such films together while exposed to radiation from a source of radiant energy located so as to transmit such radiation through a transparent member and films to heat a mark of heat absorbent black material on a white support that is pressed against the opposite side of such films, which in turn fuses and seals such films in an area corresponding to such mark, while moving the so-supported films and mark past such radiation which is of sufficient intensity to so fuse and seal the films only in such area, and then separating the so-sealed films from the mark.

6. Apparatus for heat sealing bioriented thermoplastic material, which comprises means for supporting a mark of heat absorbent material corresponding to a zone to be sealed, means for pressing the material to be sealed in overlapping relation with such mark in overlapping relation, and a source of radiant energy for energizing said heat absorbent mark which, in turn fuses the thermoplastic material only in the zone to be sealed, in which said mark supporting means includes a roll, and said pressing means includes a transparent belt for continuously advancing the thermoplastic material and mark past the radiation source during such sealing operation.

References Cited by the Examiner

UNITED STATES PATENTS

| | | | |
| --- | --- | --- | --- |
| 2,622,053 | 12/1952 | Clowe et al. | 161—115 |
| 2,699,113 | 1/1955 | Hoover | 156—272 |
| 3,018,881 | 1/1962 | Wall. | |
| 3,122,466 | 2/1964 | Shabram | 156—583 X |

EARL M. BERGERT, *Primary Examiner.*

DOUGLAS J. DRUMMOND, *Examiner.*